United States Patent
Chakra et al.

(10) Patent No.: US 10,142,272 B2
(45) Date of Patent: Nov. 27, 2018

(54) PRESENTING BROWSER CONTENT BASED ON AN ONLINE COMMUNITY KNOWLEDGE

(71) Applicant: International Business Machines Corporation, Armonk, NY (US)

(72) Inventors: Al Chakra, Apex, NC (US); Liam Harpur, Dublin (IE); Erik H. Katzen, Argyle, TX (US); John Rice, Waterford (IE)

(73) Assignee: International Business Machines Corporation, Armonk, NY (US)

(*) Notice: Subject to any disclaimer, the term of this patent is extended or adjusted under 35 U.S.C. 154(b) by 183 days.

(21) Appl. No.: 14/943,345

(22) Filed: Nov. 17, 2015

(65) Prior Publication Data

US 2017/0142045 A1  May 18, 2017

(51) Int. Cl.
*H04L 12/58* (2006.01)
*H04L 29/08* (2006.01)
*G06F 17/30* (2006.01)
*H04N 1/00* (2006.01)

(52) U.S. Cl.
CPC ........ *H04L 51/12* (2013.01); *G06F 17/30893* (2013.01); *H04L 51/32* (2013.01); *H04L 67/02* (2013.01); *H04L 67/142* (2013.01); *H04L 67/22* (2013.01); *H04N 1/00464* (2013.01)

(58) Field of Classification Search
CPC .. G06F 17/271; G06F 17/28; G06F 17/30893; H04L 51/12; H04L 67/02; H04L 67/142; H04L 67/22; H04N 1/00464
See application file for complete search history.

(56) References Cited

U.S. PATENT DOCUMENTS

| | | | |
|---|---|---|---|
| 8,005,823 B1* | 8/2011 | Marshall | G06F 17/30477 707/713 |
| 8,601,023 B2 | 12/2013 | Brave et al. | |
| 8,793,312 B2 | 7/2014 | Tao et al. | |
| 8,826,169 B1* | 9/2014 | Yacoub | G06F 3/0488 715/202 |
| 2010/0088331 A1* | 4/2010 | White | G06F 17/30867 707/759 |
| 2012/0137201 A1* | 5/2012 | White | G06F 17/30899 715/205 |
| 2013/0325858 A1* | 12/2013 | Xu | G06F 17/30699 707/730 |
| 2014/0172565 A1 | 6/2014 | Alon et al. | |
| 2014/0195977 A1* | 7/2014 | Chang | G06F 8/38 715/833 |
| 2014/0280554 A1 | 9/2014 | Webb et al. | |

* cited by examiner

*Primary Examiner* — Gil H. Lee
(74) *Attorney, Agent, or Firm* — William H. Hartwell; Hunter E. Webb; Keohane & D'Alessandro PLLC

(57) ABSTRACT

Embodiments described herein provide approaches for presenting browser content to a user. Specifically, a way for customizing content having an informational topic provided in a web browsing experience is provided. Content having the informational topic to be displayed to a user in a web browsing experience is analyzed, with the user being a member of the online community. The web browsing experience is customized based on extracted browsing behaviors of an online community. Content is displayed to the user at a level of detail and technological depth that is commensurate with a knowledge level of one or more members of the online community while hiding other content.

20 Claims, 4 Drawing Sheets

PRESENTING BROWSER CONTENT BASED ON AN ONLINE COMMUNITY KNOWLEDGE

BACKGROUND

This invention relates generally to presenting browser content and, more specifically, to presenting browser content to a user at a level of detail and technological depth that is commensurate with a knowledge level of an online community.

The Internet has made it possible for a user to electronically access any content at any time and from any location. With the explosion of information, it has become increasingly important to provide users with information that is relevant to the user and not just information in general. Further, as users in today's society rely on the Internet for their source of information, entertainment, and/or social connections, it is critical to provide users with information they find valuable.

SUMMARY

In general, embodiments described herein provide approaches for presenting browser content to a user. Specifically, a way for customizing content having an informational topic provided in a web browsing experience is provided. Content having the informational topic to be displayed to a user in a web browsing experience is analyzed, with the user being a member of an online community. The web browsing experience is customized based on extracted browsing behaviors of the online community. Content is displayed to the user at a level of detail and technological depth that is commensurate with a knowledge level of one or more members of the online community while hiding other content.

One aspect of the present invention includes a computer-implemented method for customizing content having an informational topic provided in a web browsing experience, comprising: extracting browsing behaviors of members of an online community and associating the extracted browsing behaviors with the online community; customizing the web browsing experience based on the extracted browsing behaviors, wherein customizing the web browsing experience includes at least one of: hiding content from a user that is less frequently consumed by members of the online community than content to be displayed to the user, wherein the user is a member of the online community; displaying content to the user at a level of detail and technological depth that is commensurate with a knowledge level of one or more members of the online community while hiding content with a level of detail and technological depth that is not commensurate with a knowledge level of one or more members of the online community; and displaying one or more recommended sources to the user at a level of detail and technological depth that is commensurate with the knowledge level of the user, wherein the one or more recommended sources is related to the informational topic.

Another aspect of the present invention includes a computer system for customizing content having an informational topic provided in a web browsing experience, the computer system comprising: a memory medium comprising program instructions; a bus coupled to the memory medium; and a processor for executing the program instructions, the instructions causing the system to: extract browsing behaviors of members of an online community and associating the extracted browsing behaviors with the online community; customize the web browsing experience based on the extracted browsing behaviors, wherein customizing the web browsing experience includes at least one of: hide content from a user that is less frequently consumed by members of the online community than content to be displayed to the user, wherein the user is a member of the online community; display content to the user at a level of detail and technological depth that is commensurate with a knowledge level of one or more members of the online community while hiding content with a level of detail and technological depth that is not commensurate with a knowledge level of one or more members of the online community; and display one or more recommended sources to the user at a level of detail and technological depth that is commensurate with the knowledge level of the user, wherein the one or more recommended sources is related to the informational topic.

Yet another aspect of the present invention includes a computer program product for customizing content having an informational topic provided in a web browsing experience, the computer program product comprising a computer readable storage device, and program instructions stored on the computer readable storage device, to: extract browsing behaviors of members of an online community and associating the extracted browsing behaviors with the online community; customize the web browsing experience based on the extracted browsing behaviors, wherein customizing the web browsing experience includes at least one of: hide content from a user that is less frequently consumed by members of the online community than content to be displayed to the user, wherein the user is a member of the online community; display content to the user at a level of detail and technological depth that is commensurate with a knowledge level of one or more members of the online community while hiding content with a level of detail and technological depth that is not commensurate with a knowledge level of one or more members of the online community; and display one or more recommended sources to the user at a level of detail and technological depth that is commensurate with the knowledge level of the user, wherein the one or more recommended sources is related to the informational topic.

BRIEF DESCRIPTION OF THE DRAWINGS

These and other features of this invention will be more readily understood from the following detailed description of the various aspects of the invention taken in conjunction with the accompanying drawings in which.

Figure 1:
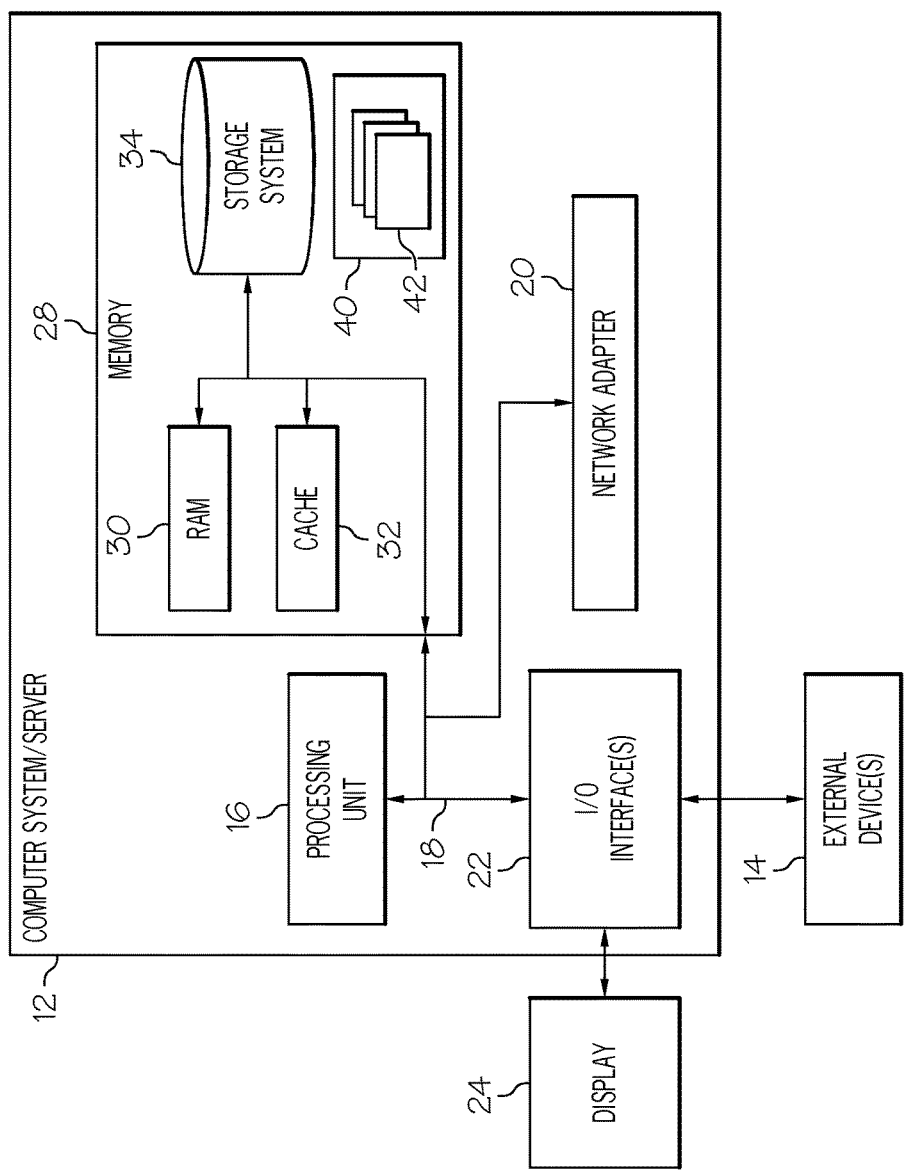
FIG. 1 shows a block diagram that illustrates a computer implementation 10 in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

As used herein, the term 'online community' refers to a online group of users, such as employees or others within or outside of a sponsoring organization, who share a common base of knowledge or expertise in a particular domain or area. Furthermore, as used herein, the term 'content' refers to any information delivered from an online source, including, but not limited to, text, videos, and images.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of: the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments described herein provide approaches for presenting browser content to a user. Specifically, a way for customizing content having an informational topic provided in a web browsing experience is provided. Content having the informational topic to be displayed to a user in a web browsing experience is analyzed, with the user being a member of an online community. The web browsing experience is customized based on extracted browsing behaviors of the online community. Content is displayed to the user at a level of detail and technological depth that is commensurate with a knowledge level of one or more members of the online community while hiding other content.

Referring now to FIG. 1, a computerized implementation 10 of an embodiment for presenting browser content to a user at a level of detail and technological depth that is commensurate with a knowledge level of an online community. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and/or distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, and/or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and/or the like, that perform particular tasks or implement particular abstract data types. In this particular example, computer system 12 represents an illustrative system for presenting browser content to a user at a level of detail and technological depth that is commensurate with a knowledge level of an online community. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and/or a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as for creating a relationship with an online community to enable a user to present browser content to a user at a level of detail and technological depth that is commensurate with a knowledge level of an online community, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a consumer to interact with computer system 12; and/or any devices (e.g., network card, modem, etc.) that enable computer system 12 to communicate with one or more other computing devices. Such communication can occur via I/O interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to: microcode, device drivers, redundant processing units, external disk drive arrays, RAID systems, tape drives, and data archival storage systems, etc.

The approaches described herein contain numerous advantages over present methods including, but not limited to, presenting browser content to a user at a level of detail and technological depth that is commensurate with a knowledge level of an online community. Embodiments of the present invention provide for utilizing combined community knowledge to enable a user to present browser content a level of detail and technological depth that is commensurate with a knowledge level of an online community. For example, a blog on a particular computer application may be read differently by an engineer and a salesperson. The blog may contain sections or links related to specific technical information related to the application which the engineer may wish to skip because he already holds that technical knowledge. Similarly, the salesperson may wish to skip over content related to sales techniques and selling the brand. Embodiments of the present invention provide for presenting browser content to a user at a level of detail and technological depth that is commensurate with a knowledge level of an online community while hiding other content.

Figure 2:
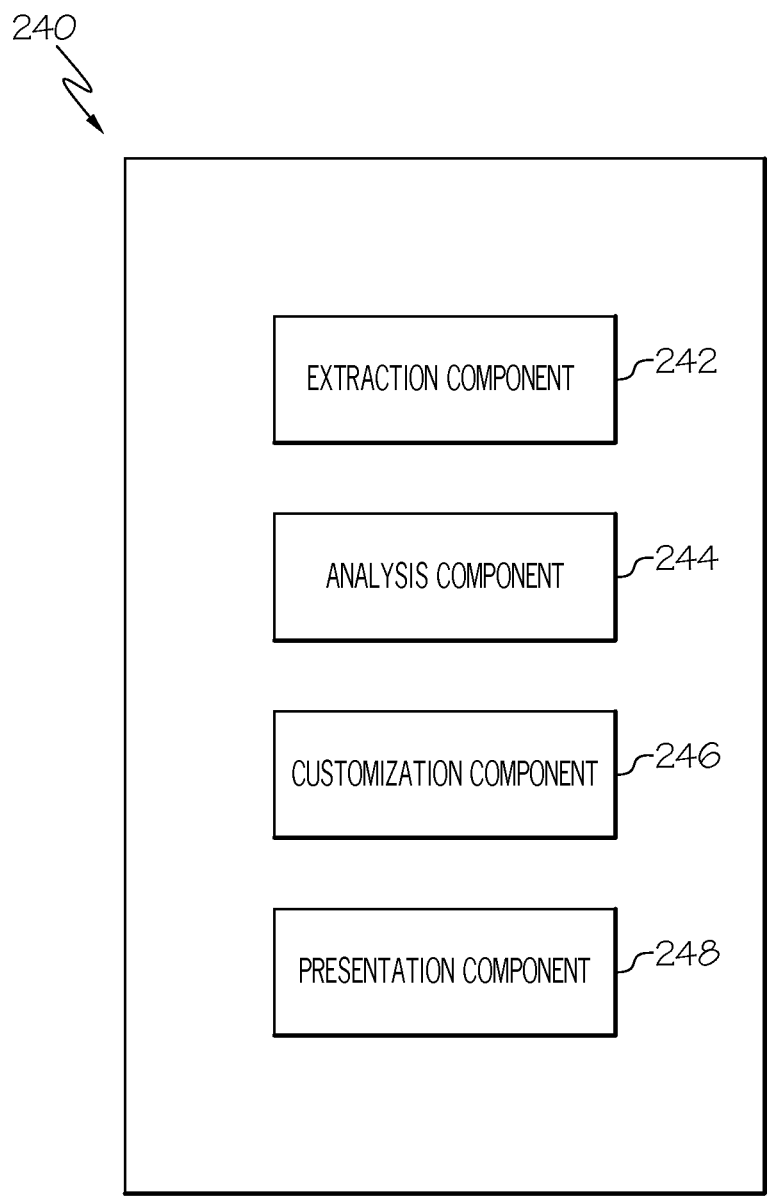
FIG. 2 shows a block diagram that illustrates a browser content tool 240 according to illustrative embodiments.

FIG. 2 shows a block diagram that illustrates a browser content tool 240 according to illustrative embodiments. As previously discussed, computer system 12 may comprise a memory (e.g., memory 28) in which browser content tool 240 resides, for example as a program module 42 of program/utility 40 (FIG. 1). In some embodiments, browser content tool 240 may be located remotely, such as on a separate server. In any case, browser content tool 240 may comprise one or more components for carrying out embodiments of the present invention. As shown, browser content tool 240 includes extraction component 242, analysis component 244, customization component 246, and presentation component 248. Each component will be addressed in detail below.

Typically, an online community provides content focusing on a common interest or theme, and allows people to join the online community (e.g., become a member) and share information with other members of the online community. Embodiments of the present invention provide for presenting browser content to a user who has become a member of an online community at a level of detail and technological depth that is commensurate with a knowledge level of the online community by leveraging the experiences of the other members of the online community.

In some embodiments, a member profile database and/or content profile database may be utilized. For example, each user may be associated with a member profile stored in the member profile database. A member profile is a conglomerate of digital items including, but not limited to, name and/or digital identity, job description, contribution to community, digital eminence, biographic information, compiled browsing behavior, compiled browsing history, one or more informational topics related to the member including a knowledge level value for each related informational topic, etc. Furthermore, the content profile database may include an index of browser content in an online community including a level of detail and technological depth for each content.

Extraction component 242 may extract browsing behaviors of members of an online community and associate the extracted browsing behaviors with the online community. For example, extraction component 242 may retrieve a browsing history (e.g., from a browsing history database) of one or more members of the online community. In some embodiments, extracted browsing behaviors may include content consumed and a subject matter of the consumed content. Alternatively or in addition, extracted browsing behaviors may include content skipped and a subject matter of the skipped content. Extraction component 242 may determine content consumed and content skipped by monitoring community member actions while the member is viewing a web page. For example, extraction component 242 may monitor page scrolling, page clicks, amount of time spent viewing the page, etc. to determine whether content was consumed or skipped. Based on the compiled monitoring of community members, extraction component 242 may determine whether the content was frequently consumed or skipped by the online community members.

In one example, a subject matter of the content consumed and content skipped may be determined based on one or more characteristic words and/or phrases used in a web page. In other examples, another method may be used to determine a subject matter of the content such as natural language processing and/or image translation. In one embodiment, content may be tagged with a skip percentage related to how often members of the online community skipped (e.g., scrolled past) the content while browsing. For example, it may be determined that a particular content is only consumed by the online community members 10% of the time and skipped 90% of the time. The skip percentage may be used when determining whether to display the content to a user.

In another embodiment, analysis component 244 may determine a level of detail and technological depth of the content having the informational topic to be displayed to a user. One or more methods may be used to analyze the content to determine the level of detail and technological depth related to the content. In one example, known natural language processing and/or image translation techniques may be used when analyzing the content. Alternatively or in addition, word choice, word difficulty, word length, word frequency, complexity of sentence structure, sentence length, sentence count, sentence and/or paragraph complexity may be analyzed when determining the level of detail and technological depth of the content.

In some embodiments, the detail and technological depth level may be defined based on a predefined scale (e.g., a scale from 1 to 10). For example, the content may be assigned a level value of 1 or 2 on a 10-scale when the content is determined to be simple and clear and intended for members having little or no knowledge regarding the informational topic, while content may be assigned a level value of 9 or 10 when the content is determined to be highly complex and intended for members already having an extensive knowledge in the informational topic. In one example, a level value may be assigned to a particular content by one or more members of the online community. In another example, the content author, an online community moderator, or other curator of the content may assign the level value.

In addition or alternatively, analysis component 244 may determine a knowledge level of one or more members of the online community related to content having an informational topic based on the browsing behaviors of the members. In other words, analysis component 244 may analyze a member's compiled browsing history (e.g., since becoming a member of the online community) of consumed content having the informational topic to determine the knowledge level related to the consumed content. The knowledge level may be gauged relative to a predefined scale (e.g., a scale from 1 to 10). For example, a member having a knowledge level of 1 or 2 on a 10-scale may be determined to have a novice level of knowledge regarding the informational topic, while a level of 9 or 10 may be determined to be an expert on the informational topic. In other words, a member having a high knowledge level (e.g., greater than 8 out of 10), may be determined to be capable of consuming complex content with a high level of detail and technological depth.

In one embodiment, a knowledge level of a member related to content having an informational topic may be determined using one or more of the methods discussed above (e.g., natural language processing, etc.). In another embodiment, a member's knowledge level may be inputted by the member (or member defined). For example, a member may define her knowledge level as being a highly knowledgeable expert regarding the information topic (e.g., 10 on a 10-scale). In another example, a member may define his knowledge level as a 2 out of 10 regarding a particular informational topic. In this case, the member may be presented with simple and clear (e.g., introductory) content related to the informational topic to gain more understanding of the topic.

In yet another embodiment, analysis component 244 may analyze a member's compiled browsing behavior to determine a knowledge level regarding content having an informational topic. For example, analysis component 244 may determine a member has posted 100 blogs with 99 of those blogs related to Java programming. In this case, the member's activity may indicate a high level knowledge level regarding Java programming. In contrast, analysis component 244 may determine a member has posted 50 blogs, with each blog being on a different topic. In this case, the member's activity may indicate that the user is only a novice in these areas.

In another embodiment, a historical view of a member's browsing behavior may be considered when determining a knowledge level of content having an informational topic. In other words, a length of time associated with a member's browsing behavior may be considered. For example, a member who has blogged on a particular informational topic for over 10 years may indicate the member a high level knowledge level regarding the informational topic. In contrast, a member who has only been blogging on a topic for a month may indicate a low knowledge level on the topic. It should be noted that the methods discussed above may be used, either alone or in conjunction with other methods, to determine a knowledge level of content having an informational topic.

In addition to helping a user consume relevant information more quickly, embodiments of the present invention may aid a user with any gaps in understanding through recommended sources to assist the user in his understanding. Analysis component 244 may determine this difficulty through common methods known in the art, such as tracking time spent on page, eye movement, cursor movement, and other digital behavior. For example, if a member of sales online community, UserA, is struggling to understand the concept of a Java Virtual Machine (i.e., the informational topic), analysis component 244 may assist UserA by recommending sources to UserA regarding Java Virtual Machines that were written by someone in sales or that were written in the context of a sales engagement. To that end, analysis component 244 analyzes each potential recommended source having the informational topic to determine a level of detail and technological depth of the recommended source. A level of detail and technological depth of a recommended source may be determined using at least one of: natural language processing techniques, image translation techniques, word choice, word difficulty, word length, word frequency, complexity of sentence structure, sentence length, sentence count, sentence complexity, paragraph complexity, or the like.

Customization component 246 may customize the web browsing experience of a user based on the extracted browsing behaviors of the members of the online community. In one embodiment, customization component 246 may customize the content by hiding content that is not frequently consumed by the members of the online community. For example, a blog related to a particular product (such as a high-end printer) may include content related to selling the product. Analysis component 244 may determine that this content is frequently skipped (e.g., exceeds a predefined skip threshold such as 80%) by the user's online community (e.g., salespersons) because the user already has knowledge related to sales techniques. In this case, customization component 246 may hide (or not display) this content to the user.

Customization component 246 may customize the web browsing based a knowledge level of one or more online community members. In one embodiment, customization component 246 may hide content with a level of detail and technological depth that is not commensurate with a knowledge level of one or more online community members. The knowledge level used may be up to the knowledge level determined for the user, the knowledge level determined for the user only, or the average knowledge level of the online community as a whole. A user may navigate to a blog post having an informational topic of interest to the user. The blog post may include content at different complexity levels.

In a first example, analysis component 244 analyzes the content to determine which parts of the content may be commensurate with a knowledge level of the user. In this case, customization component 246 may hide (or not display) any content determined to be not commensurate with the knowledge level of the user.

In a second example, analysis component 244 analyzes the content to determine which parts of the content may be commensurate with an average knowledge level of the online community members. In this case, customization component 246 may hide (or not display) any content determined to be not commensurate with the average knowledge level of the online community members.

Customization component 246 may provide one or more recommended sources to a user at a level of detail and technological depth that is commensurate with the knowledge level of the user. The recommended content is related to the informational topic being consumed by the user. In one embodiment, analysis component 244 determines a knowledge level of the user related to the informational topic. In addition, analysis component 244 determines a level of detail and technological depth for a set of recommended source related to the informational topic. Using the user's determined knowledge level and the determined levels of detail and technological depth of the recommended sources, customization component 246 may then provide recommended sources commensurate with the knowledge level of the user. Presentation component 248 then displays the customized content to the user. Presentation of the customized content is based on the content that is to be displayed or hidden based on the user knowledge level as determined above.

Figure 3:
FIG. 3 shows an example web page 300 having content related to an informational topic according to illustrative embodiments.

FIG. 3 shows an example web page 300 having an informational topic of interest to a user. As shown, web page 300 comprises a blog post related to photography. Web page 300 is organized into five sections of content: SectionA, SectionB, SectionC, SectionD, and SectionE.

Figure 4:
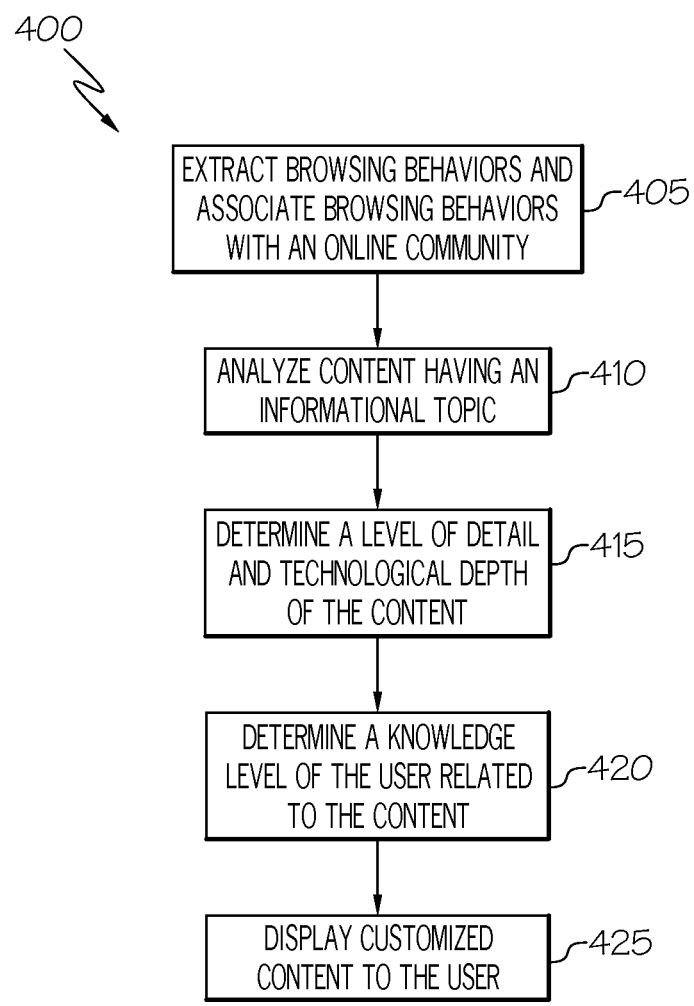
FIG. 4 shows a process flowchart 400 for presenting browser content based on a knowledge of an online community according to illustrative embodiments.

Referring now to FIG. 4, in conjunction with FIG. 3 and FIG. 2, an implementation of a process 400 for presenting browser content based on a community knowledge according to illustrative embodiments is shown. At step 405, extraction component 242 extracts browsing behaviors of users of an online community and associates the extracted browsing behaviors with the online community. In one embodiment, browsing behaviors may include content consumed (e.g., clicked on, viewed, viewed for a predefined threshold amount of time, etc.) and subject matter of the consumed content, and content skipped (e.g., not clicked, scrolled past, not viewed for the predefined threshold amount of time, etc.) and subject matter of the skipped content. The subject matter of the consumed content and skipped content may be determined using natural language processing and/or image translation techniques.

At step 410, analysis component 244 analyzes content having an informational topic. In this example, analysis component 244 analyzes content of web page 300 having information on, for example, photography. At step 415, analysis component 244 determines a level of detail and technological depth of the content. For example, SectionA and SectionB are assigned a value of 2 (on a 10-scale), SectionC is assigned a value of 3, and SectionD and SectionE are each assigned a value of 7. At step 420, analysis component 244 determines a knowledge level of the user related to photography based on the browsing behavior of the user. In this example, analysis component 244 assigns a knowledge level value of 7 to the user based on his browser behavior and activity (e.g., content consumed, content skipped, blogs posted, etc.).

At step 425, customization component 246 customizes content to be displayed and presentation component 248 displays the content to the user. In one embodiment, customization component 246 may hide SectionA, SectionB, and SectionC so that presentation component 248 displays only SectionD and SectionE to the user because SectionD and SectionE are determined to be commensurate with the user's knowledge level of the photography. This allows the user to consume only useful content, saving him time and energy.

In other embodiments, the content may be customized in other ways to distinguish content deemed to be commensurate with user's knowledge level of the informational topic from other content. For example, content deemed to be commensurate with user's knowledge level may be sorted to the top of the web page, while the other content is displayed toward the bottom of the web page. In another example, the content deemed to be commensurate with the user's knowledge may be distinguished from the other content without hiding the other content allowing the user to quickly identify the most useful content. Distinguishing content may include highlighting text, shading text, underlining text, increasing or decreasing font size, increasing or decreasing text font weight, boldfacing text, italicizing text, or the like. The customized browser content is then presented to the user in the browser based on how the content was distinguished as determined above.

Process flowchart 400 of FIG. 4 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for presenting browser content to a user at a level of detail and technological depth that is commensurate with a knowledge level of an online community. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for presenting browser content to a user at a level of detail and technological depth that is commensurate with a knowledge level of an online community. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (i.e., the Internet, a local area network, a wide area network and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches to presenting browser content to a user at a level of detail and technological depth that is commensurate with a knowledge level of an online community. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for customizing content having an informational topic provided in a web browsing experience, comprising:
    extracting browsing behaviors of a plurality of members of an online community that share a common interest and associating the extracted browsing behaviors with the online community;
    assigning a knowledge level value to each of the plurality of members based on respective extracted browsing behaviors;
    assigning an average knowledge level value to the online community based on the knowledge level values of the plurality of members;
    customizing the web browsing experience for each member of the online community based on the extracted browsing behaviors of the online community, wherein customizing the web browsing experience includes:
        hiding, from a user, the content when the content is determined to have been frequently skipped by the members of the online community at a rate exceeding a predefined skip threshold, wherein the user is a member of the online community;

assigning a detail and technological depth level value to each section of the content and each of one or more recommended sources;

displaying, to the user, one or more sections of the content with a detail and technological depth level value that is commensurate with the average knowledge level value of the online community while hiding one or more sections of the content with a detail and technological depth level value that is not commensurate with the average knowledge level value of the online community; and displaying, to the user, the one or more recommended sources with a detail and technological depth level value that is commensurate with a knowledge level value of the user, wherein the one or more recommended sources is related to the informational topic.

2. The method of claim 1, further comprising determining the detail and technological depth level value for each section of the content using at least one of: natural language processing techniques, image translation techniques, word choice, word difficulty, word length, word frequency, complexity of sentence structure, sentence length, sentence count, sentence complexity, or paragraph complexity.

3. The method of claim 1, further comprising determining a knowledge level value of a member among the one or more members of the online community includes at least one of: analyzing content consumed by the member using at least one of: natural language processing or image translation techniques, member input, or a browsing behavior of the member.

4. The method of claim 1, further comprising determining the detail and technological depth level value for each of the one or more recommended sources using at least one of: natural language processing techniques, image translation techniques, word choice, word difficulty, word length, word frequency, complexity of sentence structure, sentence length, sentence count, sentence complexity, or paragraph complexity.

5. The method of claim 1, wherein the extracted browsing behaviors include content consumed and subject matter of the consumed content, and content skipped and subject matter of the skipped content.

6. The method of claim 5, further comprising determining content skipped based on the extracted browsing behaviors including at least one of: content not clicked on, content scrolled past, or content not viewed longer than a predefined threshold amount of time.

7. The method of claim 5, wherein the subject matter of the consumed content and the subject matter of the skipped content are determined using at least one of: natural language processing techniques, image translation techniques, one or more characteristic words, or one or more characteristic phrases.

8. A computer system for customizing content having an informational topic provided in a web browsing experience, the computer system comprising:
    a memory medium comprising program instructions;
    a bus coupled to the memory medium; and
    a processor for executing the program instructions, the instructions causing the system to:
        extract browsing behaviors of a plurality of members of an online community that share a common interest and associate the extracted browsing behaviors with the online community;
        assign a knowledge level value to each of the plurality of members based on respective extracted browsing behaviors;
        assign an average knowledge level value to the online community based on the knowledge level values of the plurality of members;
        customize the web browsing experience for each member of the online community based on the extracted browsing behaviors of the online community, wherein customizing the web browsing experience includes:
            hide, from a user, the content when the content is determined to have been frequently skipped by the members of the online community at a rate exceeding a predefined skip threshold, wherein the user is a member of the online community;
            assign a detail and technological depth level value to each section of the content and each of one or more recommended sources;
            display, to the user, one or more sections of the content with a detail and technological depth level value that is commensurate with the average knowledge level value of the online community while hiding one or more sections of the content with a detail and technological depth level value that is not commensurate with the average knowledge level value of the online community; and
            display, to the user, the one or more recommended sources with a detail and technological depth level value that is commensurate with a knowledge level value of the user, wherein the one or more recommended sources is related to the informational topic.

9. The computer system of claim 8, further comprising program instructions to determine the detail and technological depth level value for each section of the content using at least one of: natural language processing techniques, image translation techniques, word choice, word difficulty, word length, word frequency, complexity of sentence structure, sentence length, sentence count, sentence complexity, or paragraph complexity.

10. The computer system of claim 8, further comprising program instructions to determine a knowledge level value of a member among the one or more members of the online community includes at least one of: analyzing content consumed by the member using at least one of: natural language processing or image translation techniques, member input, or a browsing behavior of the member.

11. The computer system of claim 8, further comprising program instructions to determine the detail and technological depth level value for each of the one or more recommended sources using at least one of: natural language processing techniques, image translation techniques, word choice, word difficulty, word length, word frequency, complexity of sentence structure, sentence length, sentence count, sentence complexity, or paragraph complexity.

12. The computer system of claim 8, wherein the extracted browsing behaviors include content consumed and subject matter of the consumed content, and content skipped and subject matter of the skipped content.

13. The computer system of claim 12, further comprising program instructions to determine content skipped based on the extracted browsing behaviors including at least one of: content not clicked on, content scrolled past, or content not viewed longer than a predefined threshold amount of time.

14. The computer system of claim 12, wherein the subject matter of the consumed content and the subject matter of the skipped content are determined using at least one of: natural language processing techniques, image translation techniques, one or more characteristic words, or one or more characteristic phrases.

15. A computer program product for customizing content having an informational topic provided in a web browsing experience, the computer program product comprising a computer readable storage device, and program instructions stored on the computer readable storage device, to:
   extract browsing behaviors of a plurality of members of an online community that share a common interest and associate the extracted browsing behaviors with the online community;
   assign a knowledge level value to each of the plurality of members based on respective extracted browsing behaviors;
   assign an average knowledge level value to the online community based on the knowledge level values of the plurality of members;
   customize the web browsing experience for each member of the online community based on the extracted browsing behaviors of the online community, wherein customizing the web browsing experience includes:
      hide, from a user, the content when the content is determined to have been frequently skipped by the members of the online community at a rate exceeding a predefined skip threshold, wherein the user is a member of the online community;
      assign a detail and technological depth level value to each section of the content and each of one or more recommended sources;
      display, to the user, one or more sections of the content with a detail and technological depth level value that is commensurate with the average knowledge level value of the online community while hiding one or more sections of the content with a detail and technological depth level value that is not commensurate with the average knowledge level value of the online community; and
      display, to the user, the one or more recommended sources with a detail and technological depth level value that is commensurate with a knowledge level value of the user, wherein the one or more recommended sources is related to the informational topic.

16. The computer program product of claim 15, further comprising program instructions to determine the detail and technological depth level value for each section of the content using at least one of: natural language processing techniques, image translation techniques, word choice, word difficulty, word length, word frequency, complexity of sentence structure, sentence length, sentence count, sentence complexity, or paragraph complexity.

17. The computer program product of claim 15, further comprising program instructions to determine a knowledge level value of a member among the one or more members of the online community includes at least one of: analyzing content consumed by the member using at least one of: natural language processing or image translation techniques, member input, or a browsing behavior of the member.

18. The computer program product of claim 15, further comprising program instructions to determine the detail and technological depth level value for each of the one or more recommended sources using at least one of: natural language processing techniques, image translation techniques, word choice, word difficulty, word length, word frequency, complexity of sentence structure, sentence length, sentence count, sentence complexity, or paragraph complexity.

19. The computer program product of claim 15, wherein the extracted browsing behaviors include content consumed and subject matter of the consumed content, and content skipped and subject matter of the skipped content.

20. The computer program product of claim 15, wherein content skipped is determined based on the extracted browsing behaviors including at least one of: content not clicked on, content scrolled past, or content not viewed longer than a predefined threshold amount of time, wherein the subject matter of the consumed content and the subject matter of the skipped content are determined using at least one of: natural language processing techniques, image translation techniques, one or more characteristic words, or one or more characteristic phrases.

* * * * *